(12) United States Patent
Thuillier et al.

(10) Patent No.: US 9,268,992 B2
(45) Date of Patent: Feb. 23, 2016

(54) SIGNUP AND BIOMETRIC VERIFICATION METHODS, AND RELATED SYSTEMS AND DEVICES

(75) Inventors: Cédric Thuillier, Paris (FR); Hervé Chabanne, Paris (FR)

(73) Assignee: MORPHO, Paris (FR)

( * ) Notice: Subject to any disclaimer, the term of this patent is extended or adjusted under 35 U.S.C. 154(b) by 204 days.

(21) Appl. No.: 13/581,439

(22) PCT Filed: Apr. 29, 2011

(86) PCT No.: PCT/FR2011/050979
§ 371 (c)(1),
(2), (4) Date: Aug. 27, 2012

(87) PCT Pub. No.: WO2011/144834
PCT Pub. Date: Nov. 24, 2011

(65) Prior Publication Data
US 2013/0051629 A1    Feb. 28, 2013

(30) Foreign Application Priority Data
May 18, 2010   (FR) ..................................... 10 53831

(51) Int. Cl.
*G06K 9/00*   (2006.01)

(52) U.S. Cl.
CPC .................................. *G06K 9/00093* (2013.01)

(58) Field of Classification Search
None
See application file for complete search history.

(56) References Cited

U.S. PATENT DOCUMENTS

| | | | |
|---|---|---|---|
| 7,474,773 B2 * | 1/2009 | Chau | 382/124 |
| 2009/0106559 A1 * | 4/2009 | Chabanne et al. | 713/186 |
| 2010/0080425 A1 * | 4/2010 | Bebis et al. | 382/125 |

FOREIGN PATENT DOCUMENTS

WO    WO 2009/011661 A1    1/2009

OTHER PUBLICATIONS

International Search report from corresponding PCT Application No. PCT/FR2011/050979 Report Dated Aug. 8, 2011.
Bazen, Asker M., et al., "Systematic Methods for the Computation of the Directional Fields and Singular Points of Fingerprints", IEEE Transactions on Pattern Analysis and Machine Intelligence, Jul. 2002, pp. 905-919, vol. 24, No. 7.
Bazen, Asker M., et al., "Detection of Cores in Fingerprints with Improved Dimension Reduction", 4th IEEE Benelux Signal Processing Symposium, 2004, pp. 41-44, Hilvarenbeek, The Netherlands.

* cited by examiner

*Primary Examiner* — Vikkram Bali
(74) *Attorney, Agent, or Firm* — Miller, Matthias & Hull LLP

(57) ABSTRACT

A method for signing up a person for biometric verification purposes is provided, the method including: acquiring an image of a biological attribute of the person, the biological attribute including a set of characteristic elements, defining, within the acquired image, at least one area that includes at least part of the biological attribute, and storing, in a biometric database, at least one piece of information indicating that the number of characteristic elements included in said defined area is less than a respective predetermined integer. A related biometric verification method is also provided.

10 Claims, 3 Drawing Sheets

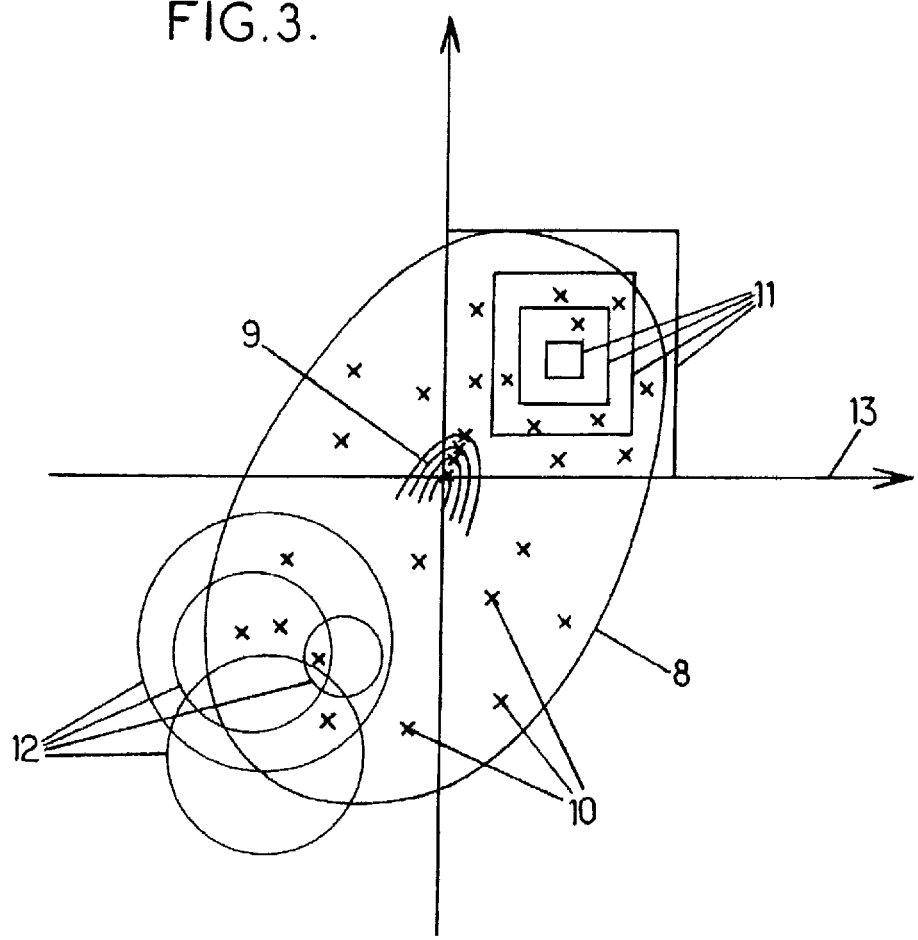

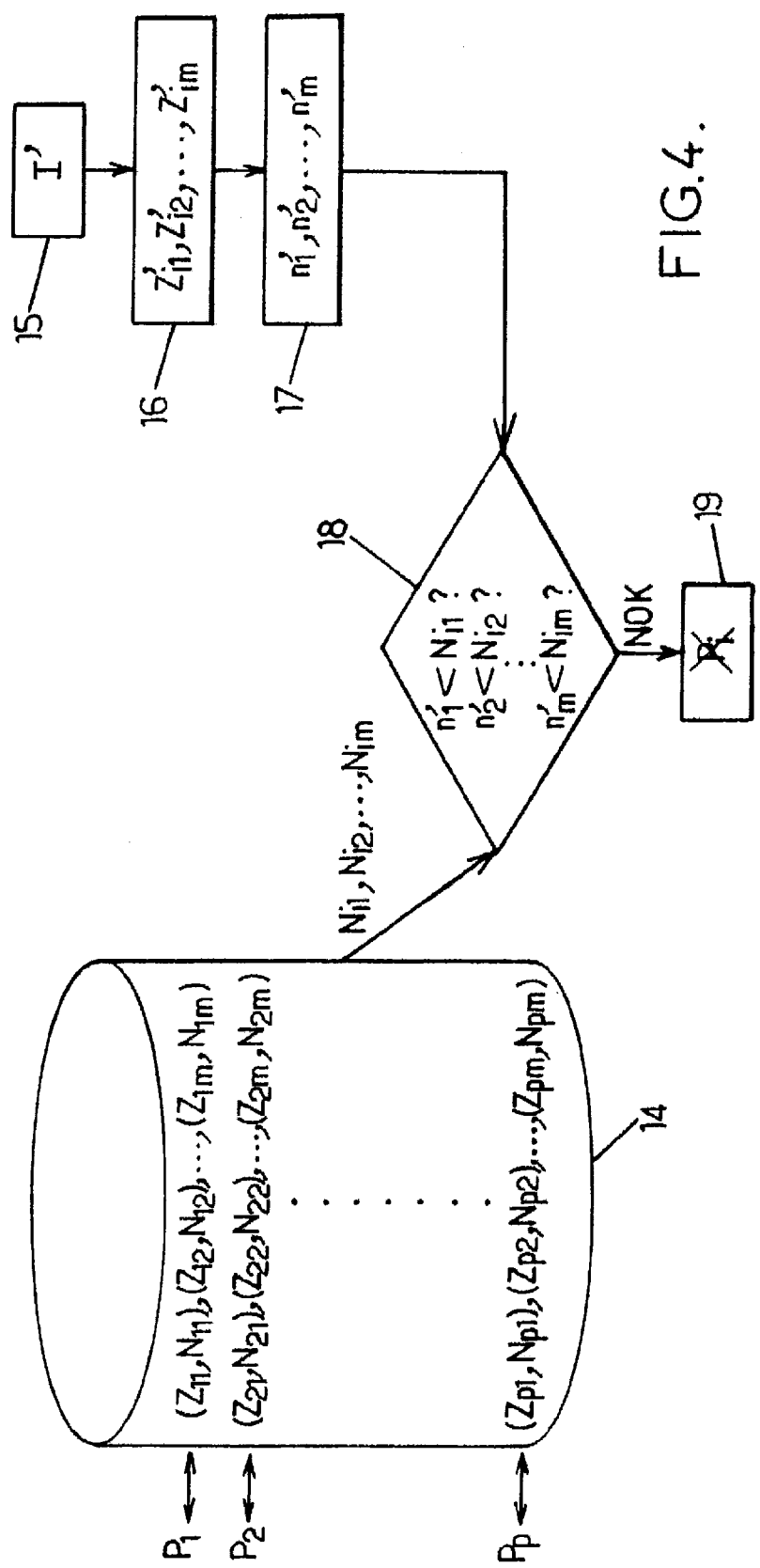

SIGNUP AND BIOMETRIC VERIFICATION METHODS, AND RELATED SYSTEMS AND DEVICES

CROSS-REFERENCE TO RELATED APPLICATIONS

This application is a 35 USC §371 U.S. national stage filing of International Patent Application No. PCT/FR2011/050979 filed on Apr. 29, 2011, which claims priority under the Paris Convention and 35 USC §119 to French Patent Application No. 10 53831, filed on May 18, 2010.

FIELD OF THE DISCLOSURE

The invention relates to biometric verification.

BACKGROUND OF THE DISCLOSURE

Biometric verification traditionally means the authentication or identification of individuals, whether human or animal, from biometric data concerning characteristics of one or more biological attributes of these individuals, such as the minutiae of fingerprints, the general shape of the fingers, the veins of a hand or finger, voice characteristics, iris characteristics, etc.

Such biometric verification conventionally uses a database in which biometric data are stored. These data concern individuals having previously undergone an enrollment (signup) phase so that they can be issued a certain right after biometric verification (driver's license, ticket for mass transit, remuneration, authorization to access a room, etc.).

A very simple example of biometric verification is illustrated in FIG. 1, which shows a database 1 storing a set of biometric data $b_1, b_2, \ldots, b_N$ for enrolled individuals.

These biometric data $b_1, b_2, \ldots, b_N$ are, for example, images representing some biological attribute for each of the different individuals (for example images of fingerprints, irises, etc.), characteristics relative to a biological attribute (for example a type, position, and orientation of minutiae in the case of fingerprints), or some other data.

Advantageously, a digital representation of biometric data can be used in order to simplify manipulation and allow these data to be used in a cryptographic algorithm.

As a non-limiting example, biometric data $b_1, b_2, \ldots, b_N$ stored in the database 1 may each consist of a digital vector, for example a binary vector. Numerous ways of obtaining a digital vector from biometric information are known.

In the example in FIG. 1, the biometric verification occurs in the following manner for a given individual. A biometric data item b' is obtained, for example in digital vector form, for the individual considered. This data item b' is compared (reference 2) to all or part of the data $b_1, b_2, \ldots, b_N$ stored in the database 1.

In case of a match or sufficient proximity thereto, one can infer that the individual concerned corresponds to an enrolled individual (identification) or to the enrolled individual he or she is claiming to be (authentication). This result is labeled R in FIG. 1.

Such a biometric verification is therefore based on an inclusive model, which tends to retain an enrolled individual as soon as his or her biological attribute reveals characteristics sufficiently close to those of the individual who is being verified.

Such a model is likely to pose certain problems.

In particular, it may require storing a large amount of information to be effective. As an example, for fingerprint minutiae it may be necessary to store the minutiae type (ridge ending or bifurcation), position, and orientation.

Such information could make it possible to find an individual by reconstructing his fingerprint, particularly if a dishonest person succeeds in accessing the contents of the database 1. This conflicts with the protection of individual privacy and freedom.

In addition, the number of operations performed during the biometric verification can be high, which is costly in terms of computational power and processing time. For a fingerprint, the comparison 2 between b' and some or all of the data $b_1, b_2, \ldots, b_N$ stored in the database 1 may require a comparison of the type, position, and orientation of each minutia of each fingerprint tested.

In the case of authentication, the biometric database 1 must be connected to an identity database (for example in alphanumeric form), to enable deciding whether or not an individual is the enrolled individual he or she is claiming to be. A one-to-one relationship between the biometric data and identity data stored in these databases could allow a dishonest person to find the correspondence between these two types of data too easily. Such a person could make use of this correspondence to steal the identity of enrolled individuals.

To overcome this problem, the use of a "weak link" between a biometric database 1 and an identity database has been proposed. Such a weak link does not allow establishing a one-to-one correspondence between biometric data and identity data, but still authorizes an authentication with an acceptable level of success. It is relatively complex to set up this weak link technique, however.

SUMMARY OF THE DISCLOSURE

One aim of the present invention is to limit at least some of these disadvantages.

The invention therefore proposes a method for enrolling an individual for biometric verification purposes, comprising the following steps:

acquiring an image of a biological attribute of said individual, said biological attribute including a set of characteristic elements;

defining, within the acquired image, at least one area including at least a portion of said biological attribute;

storing in a biometric database at least one piece of information indicating that the number of characteristic elements included in said defined area is less than a respective predetermined integer.

Such a method, which only stores in the biometric database imprecise information on the characteristics of a biological attribute, limits the risk that such information can be misused by a dishonest person to determine the identity of the enrolled individuals.

According to advantageous embodiments which can be combined in any conceivable manner:

a reference system is positioned in the acquired image as a function of at least one noteworthy element of the biological attribute, and said area is defined relative to said reference system;

a plurality of areas are defined in the acquired image, with at least some of the areas of said plurality at least partially overlapping;

said plurality of areas comprises at least a first area and a second area, the first area being included in the second area, and the biometric database stores a first piece of information indicating that the number of characteristic elements included in the first area is less than a first integer and a second piece of information indicating that the number of characteristic elements included in the second area is less than a second integer, the second integer being greater than the first integer;

for at least one defined area, the biometric database stores at least one piece of information indicating that the number of characteristic elements included in said area is zero; and/or an identity of said individual is additionally stored in an identity database, a link being provided between said identity stored in the identity database and said piece of information stored in the biometric database indicating that the number of characteristic elements included in said defined area is less than a respective predetermined integer. Such a link may possibly be strong, such as a one-to-one correspondence between these two pieces of information.

In another aspect of the invention, a method of biometric verification is proposed that uses a biometric database constructed during an enrollment procedure as mentioned above. The biometric verification method comprises the following steps relative to a given individual:

acquiring an image of a biological attribute of the given individual, said biological attribute including a set of characteristic elements;

detecting, in the acquired image, at least one area respectively corresponding to at least one area defined during the enrollment procedure;

counting the number of characteristic elements included in said detected area;

concluding that the given individual does not correspond to at least one enrolled individual, when the information stored in the biometric database relative to the enrolled individual indicates that the number of characteristic elements included in the defined area is less than a predetermined integer but the number of characteristic elements included in the detected area is not less than said predetermined integer for the given individual.

Such a biometric verification operates as an exclusive model, because it eliminates the enrolled individuals who have a distribution of characteristic elements that differs from the individual who is the object of the biometric verification. This is in contrast to the traditional inclusive model, in which an enrolled individual only becomes a candidate for comparison to the individual who is the object of the biometric verification when sufficient proximity to the biometric data concerning the individuals is detected.

Advantageously, the exclusive model can be used for an initial sorting of all enrolled individuals, then the traditional inclusive model can complete the selection by only retaining the enrolled individual or individuals closest to the individual who is the subject of the biometric verification.

The invention also proposes a system or device for implementing the enrollment method and/or the biometric verification method mentioned above.

The invention further proposes a computer program product comprising instructions for implementing the enrollment method and/or the biometric verification method mentioned above, when it is loaded into and executed by computer means.

BRIEF DESCRIPTION OF THE DRAWINGS

Other features and advantages of the invention will be apparent from the following description of some examples of non-limiting embodiments, with reference to the attached drawings in which:

FIG. 3 is a diagram illustrating an image of a biological attribute manipulated according to an exemplary embodiment of the invention;

FIG. 4 is a diagram illustrating a biometric verification implemented according to an exemplary embodiment of the invention.

DETAILED DESCRIPTION OF THE DISCLOSURE

A first aspect of the invention concerns the enrollment of one or more individuals for later biometric verification.

Figure 1:
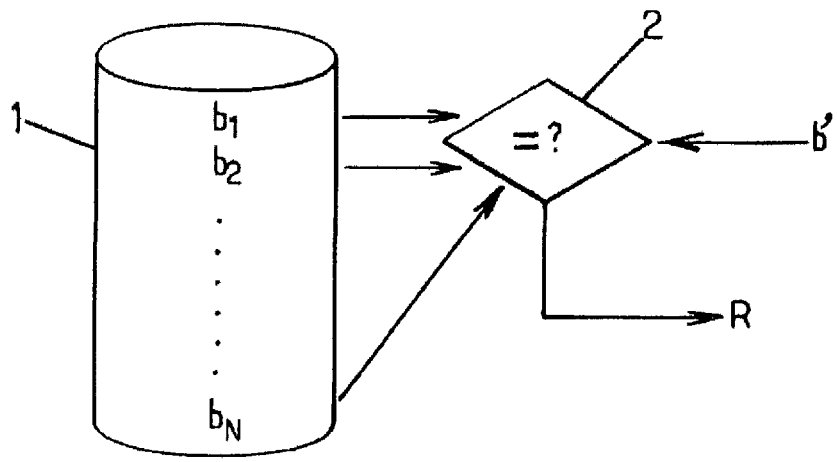
FIG. 1, already discussed, is a diagram illustrating a very simple example of biometric verification according to the prior art.
Figure 2:
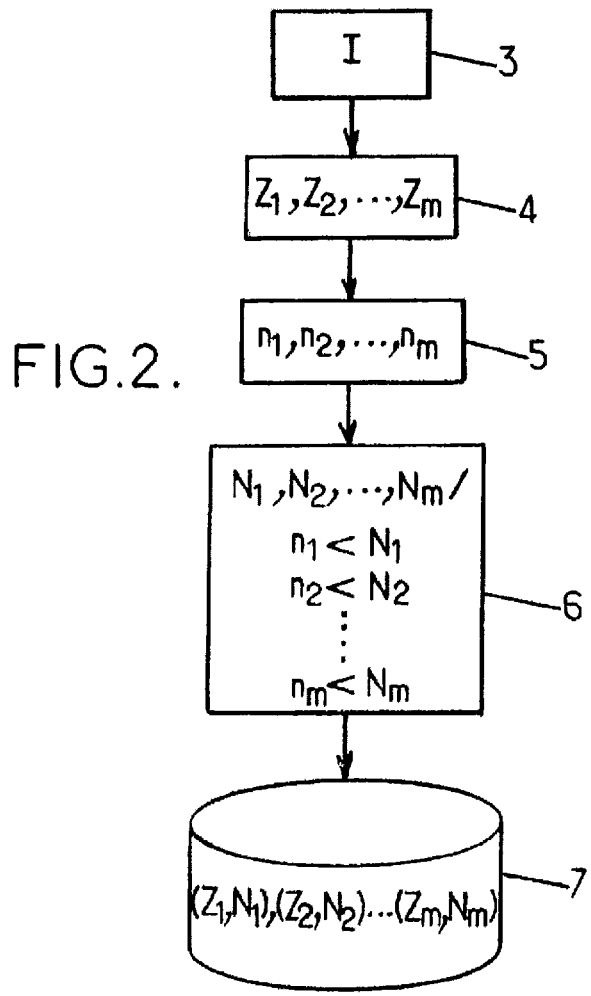
FIG. 2 is a diagram illustrating an enrollment implemented according to an exemplary embodiment of the invention.

The enrollment of an individual P can occur, for example, according to the steps illustrated in FIG. 2.

Then, in step 3, an image of a biological attribute of the individual P is acquired. The biological attribute concerned may be of any type and any nature. It may, for example, concern a fingerprint, a hand, an iris, the network of veins in a finger or hand, the face, any combination of the above biological attributes, or some other attribute(s).

In all cases, the biological attribute concerned includes a set of characteristic elements. These characteristic elements may also be of any type and any nature. For example, they may concern fingerprint minutiae (ridge endings), the general shape of a hand or face, the texture of the iris, noteworthy points in the geometry of the network of veins, or other elements.

The image of the biological attribute concerned is acquired by an appropriate means. For example, a camera or video camera may be used, possibly integrated with an appropriate biometric sensor.

Once the image is acquired, one or more areas $Z_1$, $Z_2, \ldots, Z_m$, are defined, where m is any integer (step 4). Each of these areas includes at least a portion of the biological attribute concerned.

The non-limiting example illustrated in FIG. 3 considers the image of a fingerprint in which only the outline 8 and the central ridge portions have been represented for clarity. Such a fingerprint includes a set of ridges in which the ridge endings and bifurcations constitute the minutiae 10 (indicated with "x" marks in FIG. 3).

Areas 11 and 12, each including a portion of the fingerprint, are defined in the image I of FIG. 3. The definition of all or part of these areas can be done by taking into account the geometry and/or position of the fingerprint in the acquired image I.

For this purpose, a reference system may advantageously be positioned in the image I, for example as a function of at least one noteworthy element of the biological attribute concerned.

In the example illustrated in FIG. 3, where the biological attribute consists of a fingerprint, the noteworthy element is for example the core 9 (morphological center) of the fingerprint. Techniques for detecting the core of a fingerprint are well known and can be used in the context of the invention. One can refer to the following publications for examples: "Detection of cores in fingerprints with improved dimension reduction," by A. M. Bazen and R. N. J. Veldhuis, 4th IEEE Benelux Signal Processing Symposium (SPS-2004), Hilvarenbeek, The Netherlands, 2004, pp. 41-44, or "Systematic methods for the computation of the directional fields and singular points of fingerprints" of A. M. Bazen and S. H. Gerez, IEEE Trans. Pattern Anal. Mach. Intell., vol. 24, no. 7, pp. 905-919, 2002.

A reference system 13 can then be positioned respective to this core 9, for example placing its origin at the center point and/or its axes in a direction which is dependent on an orientation of this core. Other means of positioning a reference system in the image I are conceivable, as will be apparent to a person skilled in the art.

When the biological attribute concerned is not a fingerprint, other types of noteworthy elements can be used to position a reference system in the acquired image I. Possible examples are the pupil in the case of an iris, the nose in the case of a face, a geometric center in the case of a hand, or other elements.

The areas $Z_1, Z_2, \ldots, Z_m$ can advantageously be defined relative to the reference system positioned in this manner. The areas are then not dependent on the acquisition conditions for the image I. For example, the areas may be placed in the same manner for a fingerprint, regardless of whether the fingerprint image has been acquired for a finger placed in an expected manner or with one or more translations and/or rotations relative to the expected position.

In the example in FIG. 3, two sets of areas are defined on the fingerprint image.

A first set of areas 11 is defined relative to the reference system 13, in an upper right section of the fingerprint. The areas 11 are four in number. They are square or rectangular in shape and are concentrically embedded inside one another.

A second set of areas 12 is defined in a lower left portion of the fingerprint. These areas 12 are also four in number. They are circular or elliptical in shape and some of them are at least partially overlapping.

It is understood that this is only an illustrative example. Other types of areas of possibly different shapes and/or positions are of course conceivable, as will be apparent to a person skilled in the art.

Consider the number $n_1, n_2, \ldots, n_m$ of characteristic elements included in the respective defined area $Z_1, Z_2, \ldots, Z_m$ (step 5). In the example in FIG. 3, the number of minutiae 10 in the areas denoted as 11, from smallest to largest, is respectively 0, 1, 6 and 15. The number of minutiae 10 in the areas denoted as 12 is respectively 1, 3, 1 and 5.

A set of integers $N_1, N_2, \ldots, N_m$ can be defined such that the numbers $n_1, n_2, \ldots, n_m$ of characteristic elements included in the respective defined area $Z_1, Z_2, \ldots, Z_m$ are respectively less than said integers (i.e. less than or equal to). To simplify, one can write as a rule that $N_1, N_2, \ldots, N_m$ are such that $n_1 < N_1, n_2 < N_2, \ldots,$ and $n_m < N_m$ (step 6).

The integers $N_1, N_2, \ldots, N_m$ can, for example, assume the values 0, 1, 6 and 15 in the case of the areas denoted as 11, and 1, 1, 3 and 5 in the case of the areas denoted as 12.

One will note that the integer relative to the smallest area 11 is equal to 0. This area is therefore characterized by an absence of minutiae. This goes against the traditional philosophy of enrollment, which aims to establish the presence and nature of the biometric elements rather than their absence. This "negative" representation also extends to the integers $N_1, N_2, \ldots, N_m$ that are greater than 0, because the corresponding areas can be defined as not including more than a predetermined number of characteristic elements.

In an advantageous embodiment, the areas $Z_1, Z_2, \ldots, Z_m$ are defined in relation to the integers $N_1, N_2, \ldots, N_m$. For example, the nested areas 11 in FIG. 3 could be defined so that they consist of the largest areas in the upper right section of the fingerprint including a number of minutiae 10 less than the integers 0, 1, 6 and 15 respectively. In this case, the obtained areas $Z_1, Z_2, \ldots, Z_m$ could differ fairly significantly from one fingerprint to another.

The enrollment of the individual P ends by storing, in a biometric database, information indicating that the number $n_1, n_2, \ldots, n_m$ of characteristic elements included in the respective area $Z_1, Z_2, \ldots, Z_m$ is respectively less than the integer $N_1, N_2, \ldots, N_m$ (step 7).

The stored information may consist of an identification of each area $Z_1, Z_2, \ldots, Z_m$ in association with the corresponding integer $N_1, N_2, \ldots, N_m$, as illustrated in FIG. 2.

This can be simplified, however, for example when other ways exist for identifying the areas $Z_1, Z_2, \ldots, Z_m$ and/or integers $N_1, N_2, \ldots, N_m$. For example, if the areas $Z_1, Z_2, \ldots, Z_m$ are defined in the same manner for all enrolled individuals, it may be sufficient to store only the integers $N_1, N_2, \ldots, N_m$. Similarly, if the integers $N_1, N_2, \ldots, N_m$ are common to all enrolled individuals (for example because the areas $Z_1, Z_2, \ldots, Z_m$ are constructed on a case by case basis to present a number of characteristic elements that is respectively less than the predetermined integers $N_1, N_2, \ldots, N_m$), the storage of information identifying the areas $Z_1, Z_2, \ldots, Z_m$ may be sufficient. In all cases, the information stored in the biometric database must allow comprehending that the number of characteristic elements included in the areas $Z_1, Z_2, \ldots, Z_m$ is respectively less than the integers $N_1, N_2, \ldots, N_m$.

A biometric database constructed in this manner is of interest because it reveals little information about the enrolled individuals. In particular, knowing that the number of characteristic elements in certain areas of a biological attribute is less than a predetermined integer provides much less information than a precise description of these characteristic elements such as a type, position, and orientation of each of the minutia of a fingerprint for example.

Even if a dishonest person were to obtain access to a biometric database of this type, he or she would not be able to unambiguously identify the enrolled individuals from the information stored in it. The individual freedom and privacy of the enrolled individuals are therefore better preserved than in the prior art mentioned in the introduction.

A biometric database constructed as described above, which reveals little information about the enrolled individuals, can be connected to an database of identities (for example alphanumeric). The link between the data of these two databases can be a strong link, for example a one-to-one relation, with each set of biometric data relative to an individual being associated with a respective identity. As an example, the individual P can see his or her identity stored in the identity database, using a link (such as a pointer) provided between this identity and the information stored in the database 7 concerning P.

The complexity of the weak link technique mentioned in the introduction is thus avoided, without allowing a dishonest person to uncover a specific correspondence between the biometry and identity of the enrolled individuals.

A second aspect of the invention relates to biometric verification following the enrollment of one or more individuals according to the principles discussed above.

An example of biometric verification is described below with reference to FIG. 4, for an individual P'.

The database 14 used for the biometric verification is constructed according to the principles discussed above, for a set of enrolled individuals $P_1, P_2, \ldots, P_p$ where p is any integer. Similarly to the database denoted as 7, the database denoted as 14 stores, for example, information of the type $(Z_{ji}, N_{j1})$, $(Z_{j2}, N_{j2}), \ldots, (Z_{jm}, N_{jm})$ where j ranges from 1 to p and identifies the enrolled individuals. Other types of information may be stored in the database 14, as described above with reference to FIG. 2.

When the individual P' presents himself or herself for biometric verification, an image I' is acquired of one of the individual's biological attributes that includes a set of characteristic elements (step 15). The biological attribute and the characteristic elements concerned are advantageously those used in the enrollment phase, although variants are conceivable.

The method for acquiring the image I' may be identical or similar to the one used during enrollment for acquiring the image I. The same type of acquisition device or even the same specific device may be used, for example.

In step 16, in the acquired image I', at least one area is detected which corresponds to at least one area defined during enrollment.

For example, if a same set of areas $Z_1, Z_2, \ldots, Z_m$ has been defined for all enrolled individuals, a set of identical or similar areas (for example with small adjustments such as translations, rotations, alignments in the image, etc.) is detected in the image I'.

Conversely, if sets of distinct areas have been defined based on the individual during enrollment, sets of corresponding distinct areas are detected in the image I' as a function of the entries considered in the biometric database 14. As an example, if at a given moment in the biometric verification, one wants to test a match (or non-match) between the individual P' and the previously enrolled individual $P_i$, one detects in the image I' a set of areas $Z'_{i1}, Z'_{i2}, \ldots, Z'_{im}$, corresponding to the set of areas $Z_{i1}, Z_{i2}, \ldots, Z_{im}$ defined relative to the individual $P_i$ etc. For this purpose, an indication of the areas $Z_{i1}, Z_{i2}, \ldots, Z_{im}$ is read from the biometric database 14 for example.

As an illustration, the areas $Z'_{i1}, Z'_{i2}, \ldots, Z'_{im}$ detected in this manner in the image I' could for example be identical or similar to the areas 11 and 12 of FIG. 3.

One will note that if the areas $Z_{i1}, Z_{i2}, \ldots, Z_{im}$ have been defined during enrollment using a reference system positioned on the fingerprint as a function of a noteworthy element of the fingerprint, the areas $Z'_{i1}, Z'_{i2}, \ldots, Z'_{im}$ can be detected in the image I' in a similar manner. A different orientation and/or positioning of the fingerprint in the images I and I' thus do not prevent obtaining comparable areas in the two cases.

The number $n'_1, n'_2, \ldots, n'_m$ of characteristic elements included in the detected areas $Z'_{i1}, Z'_{i2}, \ldots, Z'_{im}$ are then counted in step 17. In the case of a fingerprint, the number of minutiae in each detected area are counted, for example.

In step 18, the numbers $n'_1, n'_2, \ldots, n'_m$ obtained for the areas $Z'_{i1}, Z'_{i2}, \ldots, Z'_{im}$ are advantageously compared to the respective integers $N_{i1}, N_{i2}, \ldots, N_{im}$ stored in the biometric database 14 for the individual $P_i$.

In the case of an authentication, the data for the areas $Z_{i1}, Z_{i2}, \ldots, Z_{im}$ and/or the integers $N_{i1}, N_{i2}, \ldots, N_{im}$ corresponding to the individual $P_i$ are, for example, obtained after this individual has stated his/her identity and this identity has been found in a database of identities of enrolled individuals, the identity database having a strong link with the biometric database 14 (for example a one-to-one correspondence between the stored sets of data, as described above).

During step 18, it checks for example whether the numbers $n'_1, n'_2, \ldots, n'_m$ are less than the integers $N_{i1}, N_{i2}, \ldots, N_{im}$.

If such is not the case, for example because one or more numbers among $n'_1, n'_2, \ldots, n'_m$ are greater than the respective integers $N_{i1}, N_{i2}, \ldots, N_{im}$ (while the numbers $n'_1, n'_2, \ldots, n'_m$ of characteristic elements in the biological attribute of $P_i$ are all less than the respective integers $N_{i1}, N_{i2}, \ldots, N_{im}$ according to the information stored in the biometric database 14), this is interpreted to mean that the distribution of minutiae is different in the fingerprints of the individuals P' and $P_i$. It is concluded that P' is not comparable to the individual $P_i$. There is no match between P' and $P_i$. In other words, $P_i$ does not constitute a candidate likely to have the same identity as P. This possibility is therefore rejected (step 19).

In the case of an authentication, it can thus be concluded that P' is not the individual $P_i$ that he or she is claiming to be. In the case of an identification, the same steps 16-19 can continue for another enrolled individual $P_k$, where k is different from i, as long as it has not found at least one potential candidate (meaning as long as the enrolled individuals tested are rejected).

It is understood that such a biometric verification is therefore based on an exclusive model which tends to reject an enrolled individual as a potential candidate as long as the restrictions placed on the distribution of the characteristic elements of its biological attribute are not satisfied by the biological attribute of the individual who is the subject of the biometric verification. This differs from the traditional inclusive model presented in the introduction.

The exclusive model implemented by the biometric verification of the invention can be particularly effective. For example, it may be sufficient for an area (e.g. the smallest area 11 in the example in FIG. 3) or a limited number of areas of the biological attribute considered to have a number of characteristic elements greater than the maximum number that has been set for an enrolled individual, for there to be no match with the latter. In contrast, the traditional matching between two fingerprints typically requires comparing the type, position and orientation of a sufficient number of minutiae, which may represent a substantial number of operations.

In an advantageous embodiment of the invention, enrollment provides other information relative to characteristic elements of biological attributes of the enrolled individuals, in addition to the information stored in the biometric database 14 as described above. This information is, for example, traditional biometric data such as information concerning minutiae (e.g. type, position, orientation) in the case of fingerprints, or other information. These biometric data can be stored in the biometric database 14, next to the data presented above, or in another biometric database.

In this embodiment, the steps of the biometric verification described with reference to FIG. 4 are implemented during a first phase, in order to quickly rule out a certain number of enrolled individuals. Then a later comparison phase is implemented. This phase may advantageously be limited to the enrolled individuals not yet excluded during the first phase. This comparison (matching) can use the traditional inclusive model of biometric verification, but on an advantageously limited group of enrolled individuals.

As an example, it may comprise a comparison between at least one piece of information concerning characteristic elements of a biological attribute of the individual who is the object of the biometric verification, with the corresponding information stored during enrollment, meaning the biometric data.

Such an embodiment can enable biometric verification of about the same level of reliability as in the traditional case, but with a reduced convergence time.

Enrollment and biometric verification according to the invention may each be done using a system or a device comprising elements appropriate for this purpose. This system or device may, for example, consist of a biometric capture terminal associated with a data processing module. It may be used in both the enrollment and the biometric verification. As a variant, separate systems or devices may be used for these two procedures.

All or some of the enrollment and biometric verification operations mentioned above may be implemented with the aid of at least one computer program comprising appropriate instructions, when it is loaded into and executed by computer means.

The invention claimed is:

1. A method for enrolling an individual for biometric verification purposes, comprising:
    acquiring an image of a biological attribute of the individual, the biological attribute including a set of characteristic elements;
    defining, within the acquired image, a plurality of areas including at least a portion of the biological attribute, wherein the plurality of areas has at least a first area and a second area, the first area being included in the second area; and
    storing, in a biometric database, a first piece of information indicating that the number of characteristic elements included in the first area is less than a first integer and a second piece of information indicating that the number of characteristic elements included in the second area is less than a second integer, the second integer being greater than the first integer.

2. The method according to claim 1, wherein a reference system is positioned in the acquired image as a function of at least one noteworthy element of the biological attribute, and wherein the area is defined relative to the reference system.

3. The method according to claim 1, wherein the biometric database stores at least one piece of information indicating that the number of characteristic elements included in the defined at least one area is zero.

4. The method according to claim 1, additionally comprising storing of an identity of the individual in an identity database, and providing a link between the identity stored in the identity database and the piece of information stored in the biometric database indicating that the number of characteristic elements included in the defined at least one area is less than a respective predetermined integer.

5. A method of biometric verification using a biometric database constructed during an enrollment procedure according to claim 1, the method of biometric verification comprising:
    acquiring an image of a biological attribute of a given individual, the biological attribute including a set of characteristic elements;
    detecting, in the acquired image, at least one area respectively corresponding to the at least one area defined during the enrollment procedure;
    counting the number of characteristic elements included in the detected at least one area; and
    concluding that the given individual does not correspond to at least one enrolled individual when an information stored in the biometric database relative to the enrolled individual indicates that the number of characteristic elements included in the defined at least one area is less than a predetermined integer but the number of characteristic elements included in the detected at least one area is not less than the predetermined integer for the given individual.

6. The method according to claim 5, wherein a biometric database additionally stores other information relative to characteristic elements of biological attributes of the enrolled individuals, and wherein the biometric verification additionally comprises a later phase of comparison between at least one piece of corresponding information concerning characteristic elements of a biological attribute of the given individual with at least one piece of information stored in the biometric database relative to at least one individual for whom it has not been previously concluded that there is no match with the given individual.

7. A system arranged to implement a method of biometric verification according to claim 5, the system comprising, relative to a given individual:
    an acquisition unit for acquiring an image of a biological attribute of the given individual, the biological attribute including a set of characteristic elements;
    a detection unit for detecting, within the acquired image, at least one detected area respectively corresponding to at least one defined area defined during the enrollment procedure;
    a counting unit for counting the number of characteristic elements included in the at least one detected area; and
    a decision unit for concluding that the given individual does not correspond to at least one enrolled individual, when an information stored in the biometric database relative to the enrolled individual indicates that the number of characteristic elements included in the at least one defined area is less than a predetermined integer but the number of characteristic elements included in the at least one detected area is not less than the predetermined integer for the given individual.

8. A non-transitory computer program product comprising instructions that when loaded and executed by a processor perform the enrollment procedure according to claim 1.

9. A system arranged to implement a method of enrolling an individual for the purposes of a biometric verification according to claim 1, the system comprising:
    an acquisition unit for acquiring an image of a biological attribute of the individual, the biological attribute including a set of characteristic elements;
    a definition unit for defining, within the acquired image, a plurality of areas that includes at least a portion of the biological attribute, wherein the plurality of areas has at least a first area and a second area, the first area being included in the second area; and
    a biometric database for storing a first piece of information indicating that the number of characteristic elements included in the first area is less than a first integer and a second piece of information indicating that the number of characteristic elements included in the second area is less than a second integer, the second integer being greater than the first integer.

10. A non-transitory computer program product comprising instructions that when loaded and executed by a processor perform the biometric verification method according to claim 5.

* * * * *